(12) United States Patent
Frey et al.

(10) Patent No.: US 12,436,311 B2
(45) Date of Patent: Oct. 7, 2025

(54) ANTENNA SHIELD FOR ELECTROMAGNETIC LOGGING TOOL

(71) Applicant: Schlumberger Technology Corporation, Sugar Land, TX (US)

(72) Inventors: Mark Frey, Sugar Land, TX (US); Anatoly Dementyev, Sugar Land, TX (US); Dean Homan, Damon, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 97 days.

(21) Appl. No.: 18/557,837

(22) PCT Filed: May 11, 2022

(86) PCT No.: PCT/US2022/072236
§ 371 (c)(1),
(2) Date: Oct. 27, 2023

(87) PCT Pub. No.: WO2022/241421
PCT Pub. Date: Nov. 17, 2022

(65) Prior Publication Data
US 2024/0210589 A1     Jun. 27, 2024

Related U.S. Application Data

(60) Provisional application No. 63/201,716, filed on May 11, 2021.

(51) Int. Cl.
*G01V 3/30*      (2006.01)
*E21B 47/017*   (2012.01)
*H01Q 1/52*     (2006.01)

(52) U.S. Cl.
CPC .............. *G01V 3/30* (2013.01); *E21B 47/017* (2020.05); *H01Q 1/52* (2013.01)

(58) Field of Classification Search
CPC .......... G01V 3/30; G01V 3/26; E21B 47/017; E21B 47/00; E21B 47/01; H01Q 1/52
USPC ....................................................... 324/333
See application file for complete search history.

(56) References Cited

U.S. PATENT DOCUMENTS

| | | |
|---|---|---|
| 5,551,287 A | 9/1996 | Maute |
| 5,631,563 A | 5/1997 | Moriarty |
| 6,380,744 B2 | 4/2002 | Clark |
| 6,566,881 B2 | 5/2003 | Omeragic |

(Continued)

FOREIGN PATENT DOCUMENTS

WO     2005033633 A2     4/2005

OTHER PUBLICATIONS

International Search Report and Written Opinion issued in International Patent application PCT/US2022/072236 on Aug. 26, 2022, 11 pages.

*Primary Examiner* — Roberto Velez
(74) *Attorney, Agent, or Firm* — Jeffrey D. Frantz

(57) ABSTRACT

A shield for deployment about an antenna on an electromagnetic logging tool includes an electrically conductive, hollow body configured for coaxial deployment about the antenna. The hollow body includes a plurality of slots that extend through the hollow body. An outer surface of the hollow body includes at least one recess, at least a portion of which extends between and substantially orthogonal to the plurality of slots.

25 Claims, 6 Drawing Sheets

(56) References Cited

U.S. PATENT DOCUMENTS

| | | | |
|---|---|---|---|
| 7,436,183 B2* | 10/2008 | Clark | E21B 47/13 |
| | | | 324/343 |
| 7,663,372 B2* | 2/2010 | Signorelli | H01Q 7/06 |
| | | | 324/343 |
| 8,207,060 B2* | 6/2012 | Yang | H01L 21/76862 |
| | | | 257/E21.228 |
| 8,497,673 B2* | 7/2013 | Wang | G01V 3/30 |
| | | | 343/756 |
| 9,366,780 B2* | 6/2016 | Wisler | G01V 3/28 |
| 11,112,523 B2 | 9/2021 | Frey | |
| 2011/0074427 A1 | 3/2011 | Wang | |
| 2011/0238312 A1 | 9/2011 | Seydoux | |
| 2015/0061682 A1 | 3/2015 | Homan | |
| 2019/0271792 A1 | 9/2019 | Bittar | |
| 2020/0348437 A1 | 11/2020 | He | |

* cited by examiner

ANTENNA SHIELD FOR ELECTROMAGNETIC LOGGING TOOL

CROSS REFERENCE TO RELATED APPLICATIONS

This application is a National Stage Entry of International Application No. PCT/US2022/072236, filed May 11, 2022, which claims the benefit of U.S. Provisional Application No. 63/201,716, filed May 11, 2021, which are incorporated herein by reference in their entirety.

BACKGROUND INFORMATION

Electromagnetic logging measurements are commonly made in oilfield operations. Such measurements may provide formation resistivity and dielectric properties as well as information about remote geological features (e.g., remote beds, bed boundaries, and/or fluid contacts) not intercepted by the measurement tool. This information may be used to evaluate the potential hydrocarbon bearing capacity of the formation as well as to provide information for steering the direction of drilling (e.g., in a geosteering operation).

Numerous tools and methods are known in the art for making logging while drilling (LWD) electromagnetic measurements. One difficulty in making such measurements (both conventional and directional resistivity measurements) is constructing transmitting and receiving antennas that are capable of withstanding the demanding downhole conditions. As is known to those of ordinary skill in the art, LWD tools are routinely subject to severe mechanical impacts with the borehole wall and with cuttings in the borehole fluid. These impacts would quickly destroy the sensitive antenna components if they were left unprotected.

Commercially available electromagnetic logging tools commonly employ metallic shields to physically protect the antennas. Suitable antenna shields should provide sufficient mechanical protection without distorting and/or over-attenuating the transmitted and/or received electromagnetic waves. In practice, antenna shields that provide suitable protection also attenuate or selectively attenuate the electromagnetic waves due to the physical barrier that they provide. There is a difficult practical tradeoff in configuring an antenna shield that provides sufficient mechanical protection and has sufficiently low attenuation, a non-selective attenuation, or an attenuation with a desired selectivity.

This difficulty has been previously addressed through the use of shields having a plurality of slots extending through the shield wall (from an outer surface to an inner surface). For example, shields having axial slots are commonly used to protect non-directional (z-mode or axial) antennas while shields having circumferential slots are commonly used to protect directional (x-mode or transverse) antennas.

SUMMARY

A shield is disclosed for deployment about an antenna on an electromagnetic logging tool in which the antenna is configured to transmit or receive electromagnetic energy in a subterranean wellbore. The shield includes an electrically conductive, hollow body configured for coaxial deployment about the antenna. The hollow body includes a plurality of slots that extend through the hollow body. An outer surface of the hollow body includes at least one recess, at least a portion of which extends between and substantially orthogonal to the plurality of slots.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Disclosed embodiments relate generally to electromagnetic logging tools and more particularly to an antenna shield for an electromagnetic logging tool. Antenna shields are subject to wear during use. This wear can change the attenuation characteristics of the shield and reduce the accuracy of the electromagnetic logging measurements.

A shield is disclosed for deployment about an antenna on an electromagnetic logging tool in which the antenna is configured to transmit or receive electromagnetic energy in a subterranean wellbore. The shield includes an electrically conductive, hollow body configured for coaxial deployment about the antenna. The hollow body includes a plurality of slots that extend through the hollow body. An outer surface of the hollow body includes at least one recess, at least a portion of which extends between and substantially orthogonal to the plurality of slots.

An electromagnetic logging while drilling tool is further disclosed. The logging tool includes a logging while drilling tool body configured for deployment in a drill string and at least one electromagnetic antenna deployed on the tool body (or wound about a recess in the tool body). The antenna is configured to transmit or receive electromagnetic energy in a subterranean wellbore. A substantially cylindrical, electrically conductive shield is deployed coaxially on the tool body about the antenna. The shield includes a plurality of slots extending through the body of the shield. An outer surface of the shield includes at least one recess, at least a portion of which extends between and substantially orthogonal to the plurality of slots.

In some embodiments, the disclosed shield and LWD tool embodiments may provide for improved measurement accuracy. In particular, in some embodiments the disclosed shield embodiments may provide more stable and predictable attenuation characteristics that tend to be less susceptible to mechanical wear than prior shields. In some embodiments, reduced sensitivity to wear may in turn reduce (e.g., significantly reduce) the frequency of required recalibrations and thereby reduce tool maintenance costs and turn-around time between logging operations.

Figure 1:
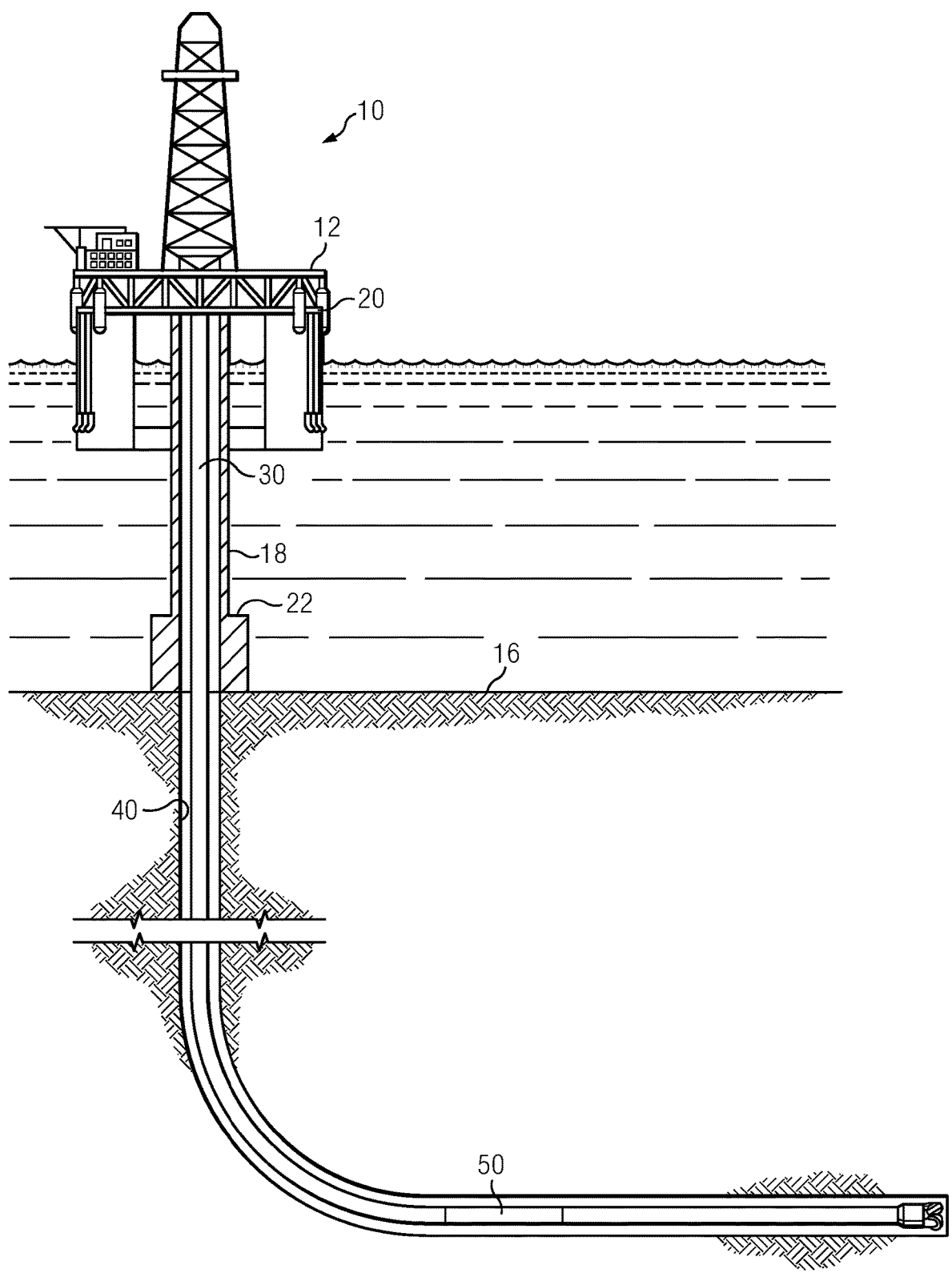
FIG. 1 depicts an example drilling rig for employing various shield and electromagnetic logging tool embodiments disclosed herein.

FIG. 1 depicts an example drilling rig 10 suitable for employing various shield and electromagnetic logging tool embodiments disclosed herein. A semisubmersible drilling platform 12 is positioned over an oil or gas formation (not shown) disposed below the sea floor 16. A subsea conduit extends from deck of platform to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA). The BHA includes an electromagnetic logging tool 50 configured to make downhole electromagnetic logging measurements.

The deployment illustrated on FIG. 1 is merely an example. Drill string 30 may include substantially any suitable downhole tool components, for example, including a steering tool such as a rotary steerable tool, a downhole telemetry system, and one or more additional measurement while drilling (MWD) and/or logging while drilling (LWD) tools including various sensors for sensing downhole characteristics of the borehole and the surrounding formation. The disclosed embodiments are by no means limited to any particular drill string and/or BHA configuration.

The disclosed embodiments are not limited to use with a semisubmersible platform 12 as illustrated on FIG. 1. The disclosed embodiments are equally well suited for use with either onshore or offshore subterranean operations. Moreover, the disclosed embodiments are not limited to logging while drilling operations, but may be equally well suited for use in wireline operations.

Electromagnetic logging tools commonly employ multiple electromagnetic transmitters and/or receivers spaced along a tool body. Commercially available electromagnetic logging tools and services are well known, including, for example, the EcoScope, GeoSphere®, and PeriScope® logging tools and associated services available from Schlumberger.

As described above, such tools commonly employ metallic shields to physically protect the sensitive transmitter and receiver (transceiver) components from cuttings in the drilling fluid and contact with the wellbore wall. These shields commonly employ slots to reduce attenuation of electromagnetic energy. The outer surface of the shields may also be coated with a wear resistant material to reduce wear. Wear bands having an outer diameter greater than that of the shield are also commonly employed to reduce wear.

Notwithstanding such wear mitigation efforts, the outer surfaces of the shields do wear over time with use of the tool. The wear is known to reduce the outer diameter of the shield and can affect the calibration of propagation resistivity measurements. As the shields wear, attenuation of electromagnetic energy tends to decrease with the decreasing outer diameter and decreasing thickness of the shield.

Figure 2:
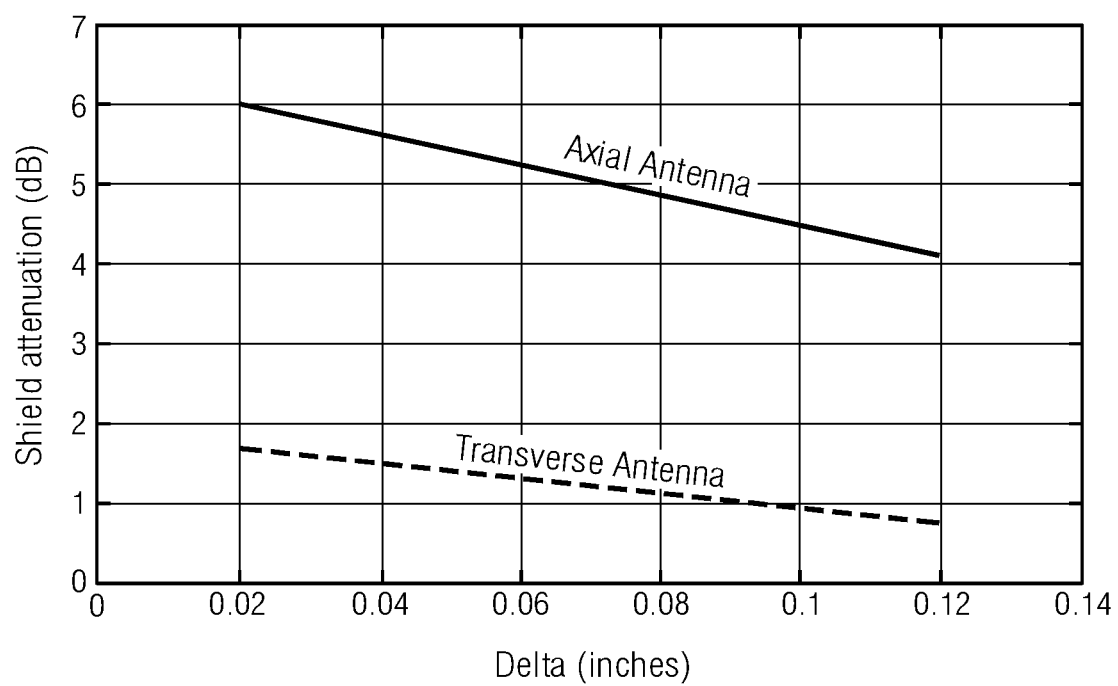
FIG. 2 depicts a plot of modeled shield attenuation in decibels (dB) versus change in shield thickness in units of inches for an axial (z-mode) antenna coil and a transverse (x-mode) antenna coil at a frequency of 100 kHz.

FIG. 2 depicts a plot of modeled shield attenuation in decibels (dB) versus change in shield thickness in units of inches for an axial (z-mode) coil and a transverse (x-mode) coil at a frequency of 100 kHz. As depicted, shield attenuation decreases with decreasing shield thickness. The slope of the attenuation versus thickness curve was observed to be a decrease in attenuation of about 0.012 dB per mil (thousandth of an inch) for the axial antenna coil and shield and about 0.011 dB per mil for the transverse antenna coil and shield. This changing attenuation can negatively impact the accuracy of (or long term stability of) electromagnetic measurements over time. The present inventors determined that there is a benefit to developing an antenna shield having attenuation characteristics that are less sensitive to wear (or substantially insensitive to wear).

Figure 3:
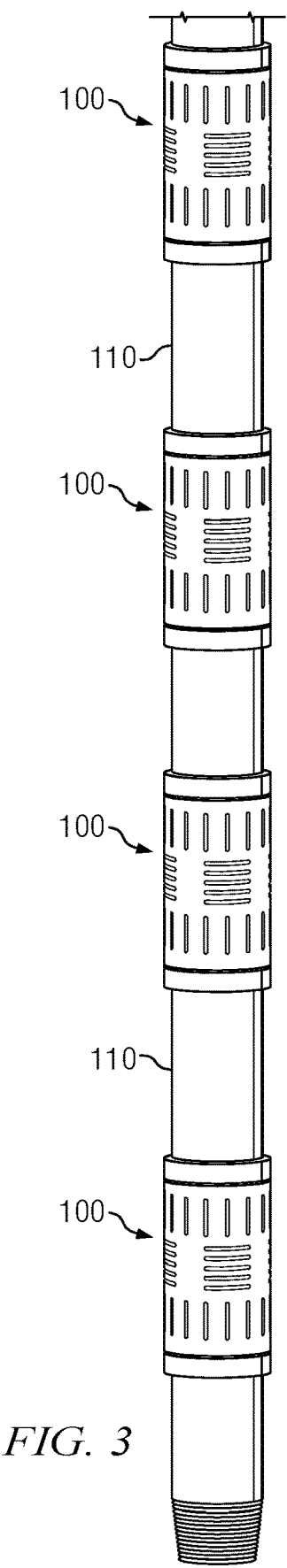
FIG. 3 depicts one example embodiment of logging tool 50 shown on FIG. 1.

Turning now to FIG. 3, one example embodiment of logging tool 50 (FIG. 1) is depicted including at least one of the disclosed shields 100 deployed about a logging tool collar 110. The logging tool 50 may include substantially any suitable number of the shields 100 deployed about corresponding transmitting and/or receiving antennas (which may be structurally the same or different). Moreover, individual ones of the shields 100 may be deployed about a single antenna or about plurality of substantially collocated antennas (e.g., biaxial or triaxial antennas located in close proximity to one another on the tool collar 110). The disclosed embodiments are not limited in any of these regards.

In some embodiments, the disclosed shield 100 may be deployed about an axial antenna, a transverse antenna, or a biaxial or triaxial antenna arrangement including at least one axial antenna and at least one transverse antenna. For example, in the depicted embodiment, shield 100 may be deployed about an antenna arrangement including first and second axial antennas and a transverse antenna (e.g., a saddle coil). An axial antenna is one whose magnetic moment is substantially parallel with the longitudinal axis of the tool (by convention the z direction). A transverse antenna is one whose magnetic moment is substantially perpendicular to the longitudinal axis of the tool. A transverse antenna may include a saddle coil (e.g., as disclosed in commonly owned U.S. Patent Publications 2011/0074427 and 2011/0238312) and generates a radiation pattern that is substantially equivalent to a dipole that is perpendicular to the axis of the tool (by convention the x or y direction). While not depicted herein, the shield assembly 100 may likewise be deployed about a tilted antenna whose magnetic moment is neither parallel nor perpendicular with the axis of the tool. Tilted antennas are well known.

In some embodiments, the attenuation induced by an antenna shield is most sensitive to the thickness of the shield directly above (radially above) the antenna coil. For example, a transmitting antenna induces a time varying current on the inner surface of the shield, particularly on the portion of the inner surface radially above the antenna coil. Slots having an orientation perpendicular to the direction of the current flow enable the current to also flow along the outer surface of the shield with a maximum current density radially above the coil (i.e., directly outward from coil in a radial direction). It is this current density distribution on the outer surface of the shield that generates the electromagnetic wave in the surrounding environment.

In a receiving antenna, the electromagnetic energy in the surrounding environment induces a time varying current on the outer surface of the shield. Slots having an orientation perpendicular to the direction of the current flow enable the current to also flow along the inner surface of the shield. The current flowing on the inner surface of the shield induces a corresponding current in the antenna coil, with the coil being most sensitive to currents radially above the coil (i.e., in closest proximity to the coil windings).

Figure 4:
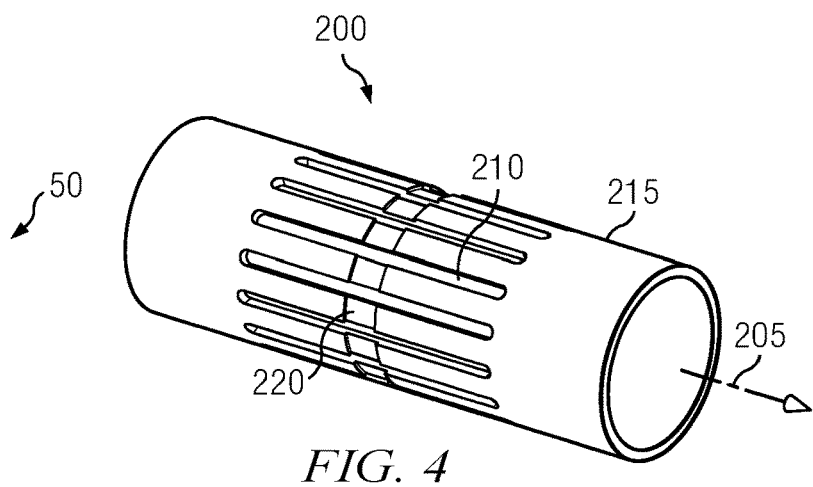
FIG. 4 depicts one example shield embodiment configured for deployment about an axial (z-axis) antenna.

Turning now to FIG. 4, shield 200 is configured for deployment about an axial antenna on a downhole logging tool and includes a hollow body having a plurality of axial slots 210 circumferentially spaced about the periphery of the shield 200 and extending through the shield (i.e., from the inner diameter to the outer diameter). In the depicted embodiment the axial slots 210 are substantially parallel with one another and with a longitudinal axis 205 of the shield 200.

An outer surface 215 of shield 200 further includes at least one recess 220 that is substantially orthogonal (e.g., generally perpendicular) to the slots 210. In the depicted embodiment, the recess (or recesses) 220 is/are substantially circumferential about the shield and intercept the slots 210 at a right angle. While not depicted on FIG. 4, the recess 220 (or one of a plurality of recesses) is intended to be located radially above (radially outward from) the circumferentially wrapped antenna coil when the shield is deployed on a logging tool. In some embodiments, the recess 220 may intercept the slots 210 at an approximate midpoint along the axial length of the slots 210.

Figure 5:
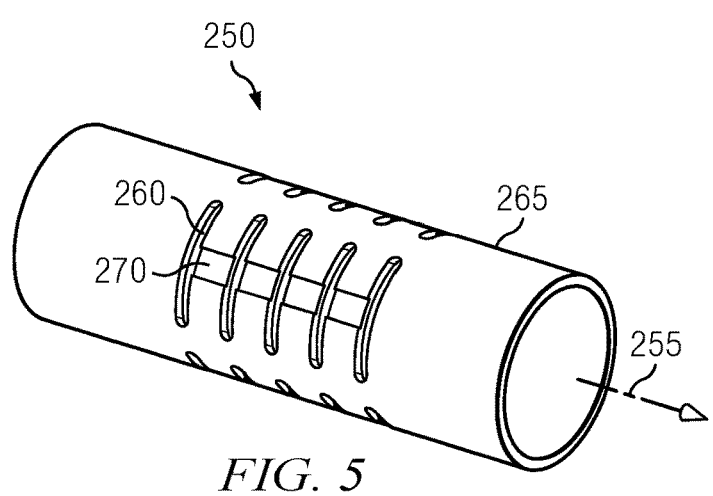
FIG. 5 depicts another example shield embodiment configured for deployment about a transverse (x-axis) antenna (e.g., a saddle coil).

FIG. 5 depicts another shield 250. Shield 250 is configured for deployment about a transverse antenna (e.g., a saddle coil for the particular embodiment depicted) on a downhole logging tool and includes a hollow body having a plurality of circumferential slots 260 axially spaced and extending through the shield (i.e., from the inner diameter to the outer diameter of the shield). As depicted, the circumferential slots 260 are substantially parallel with one another and orthogonal to the longitudinal axis 255 of the shield 250.

An outer surface 265 of shield 250 further includes a recess 270 (or a plurality of recesses) that is/are substantially orthogonal to the slots 260. In the depicted embodiment, the recess 270 extends in an axial direction (parallel with axis 255) and intercepts the circumferential slots 260 at a right angle. While not depicted on FIG. 5, the recess 270 (or one of a plurality of recesses) is intended to be located radially above (radially outward from) an axial portion of the antenna coil when the shield is deployed on a logging tool. In some embodiments shield 250 includes first and second recesses that are substantially parallel with one another, each of which is intended to be located above a corresponding axial portion of the antenna coil (e.g., an axial portion of a saddle coil in the depicted embodiment).

Figure 6:
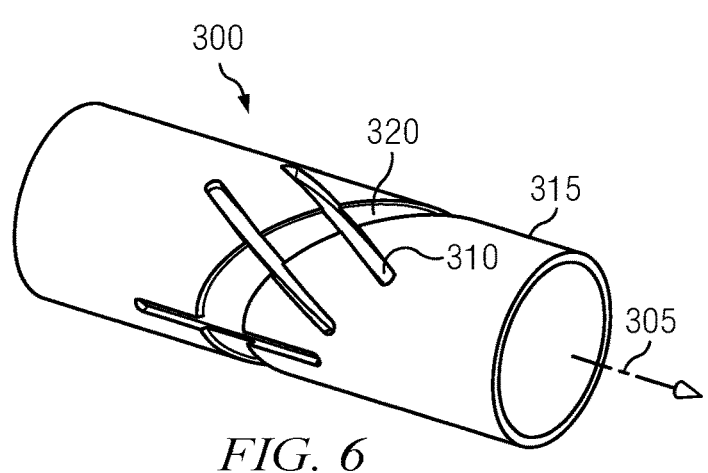
FIG. 6 depicts still another shield embodiment configured for deployment about a tilted antenna.

FIG. 6 depicts another shield 300. Shield 300 is configured for deployment about a tilted antenna on a downhole logging tool and includes a hollow body having a plurality of slots 310 extending through the shield (i.e., from the inner diameter to the outer diameter of the shield). As depicted, the slots 310 are angled with respect to each other and with respect to the longitudinal axis 305 of the shield 300.

An outer surface 315 of shield 300 further includes a recess 320 (or a plurality of recesses) that is/are substantially orthogonal to the slots 310. In the depicted embodiment, the recess 320 is tilted with respect to longitudinal axis 305 and intercepts each of the slots 310 at a right angle at an approximate midpoint along the length of the slot 310. While not depicted on FIG. 6, the recess 320 (or one of a plurality of recesses) is intended to be located radially above (radially outward from) a tilted antenna coil when the shield is deployed on a logging tool.

Figure 7A:
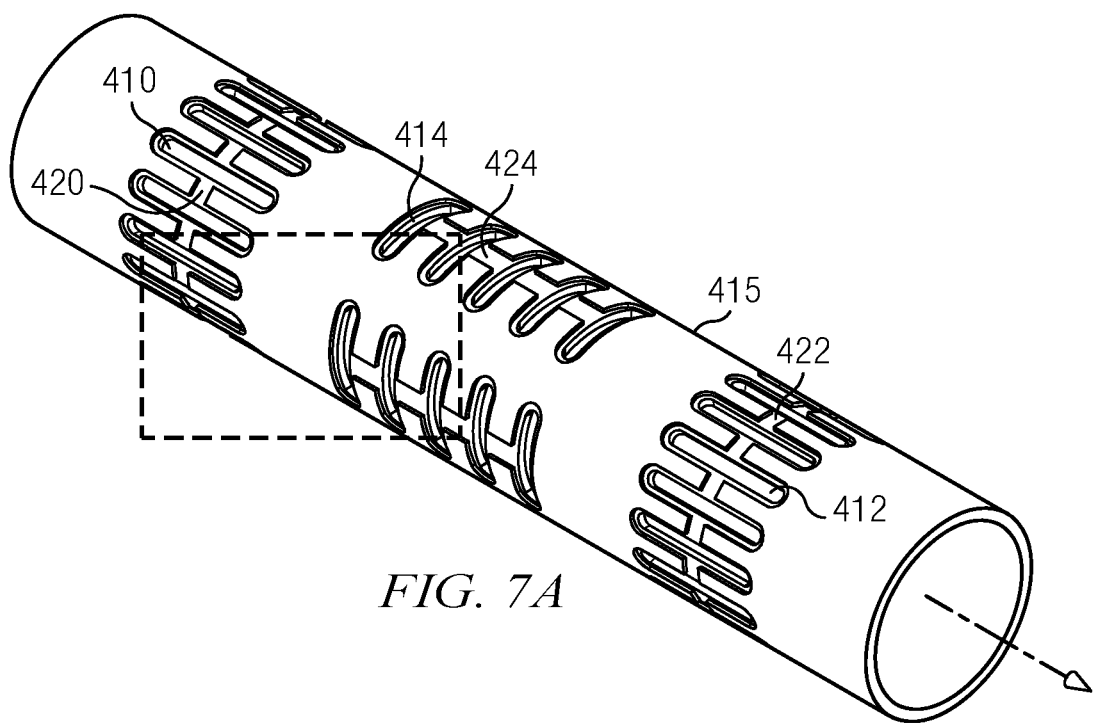
FIGS. 7A and 7B depict another example shield embodiment 400 configured for deployment about an antenna arrangement including first and second axial antennas and a transverse antenna.
Figure 7B:
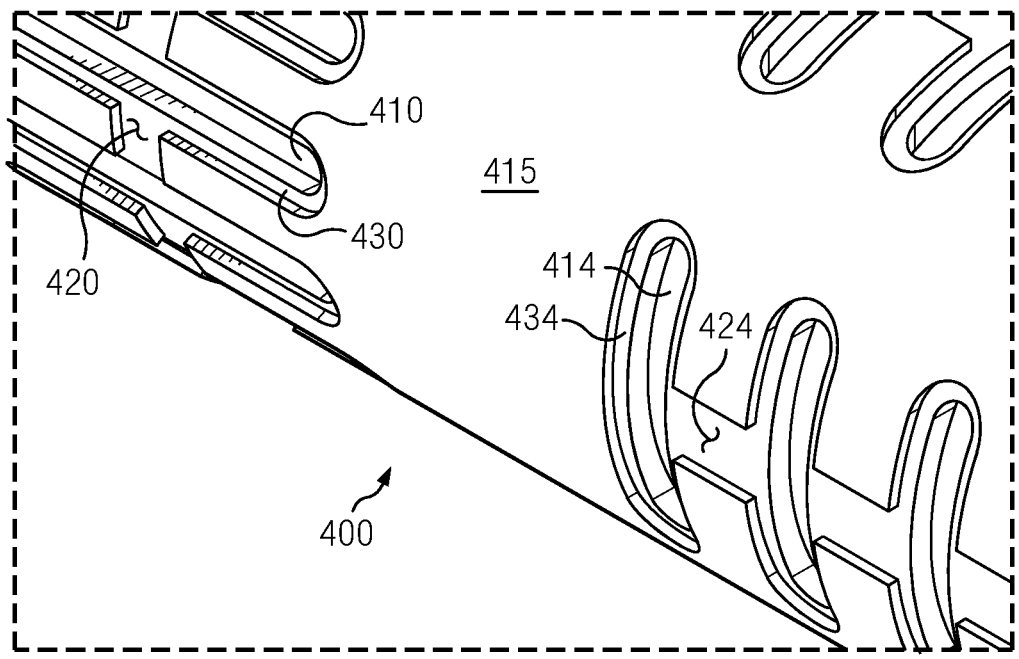

FIGS. 7A and 7B (collectively FIG. 7) depict shield 400. Shield 400 is configured for deployment about a substantially collocated antenna arrangement including first and second axial antennas and a transverse antenna (e.g., a saddle coil for the particular embodiment depicted). The shield 400 includes first and second pluralities of circumferentially spaced axial slots 410 and 412 axially about (uphole and downhole from) a plurality of axially spaced circumferential slots 414 that extend through the shield (i.e., from the inner diameter to the outer diameter of the shield). As depicted, the axial slots 410 and 412 are substantially parallel with one another and with longitudinal axis 405. The circumferential slots 414 are substantially parallel with one another and are orthogonal with axis 405.

An outer surface 415 of shield 400 further includes at least first and second circumferential recesses 420 and 422 that extend between and are substantially orthogonal to the axial slots 410 and 412. The outer surface 415 further includes first and second axial recess 424 and 426 that extend between and are substantially orthogonal to the circumferential slots 412. While not depicted on FIG. 7, the recesses 420 and 422 are intended to be located radially above (radially outward from) the underlying axial antennas while the recesses 424 and 426 are intended to be located radially above (radially outward from) corresponding axial portions of the saddle coil (the transverse antenna) when the shield is deployed on a logging tool (as described above with respect to FIGS. 4 and 5).

As depicted in the expanded view of FIG. 7B, the outer surface of the shield 400 may further optionally include one or more recesses about a periphery of at least one of the slots. For example, in the depicted embodiment, the axial slots 410 include recess 430 about the periphery of the axial slots while circumferential slots 414 include recess 434 about the periphery of the circumferential slots. These recesses 430 and 434 may extend about the entirety of the slots 410 and 414 or a portion thereof. While the disclosed embodiments are not limited in this regard, in the depicted embodiment recesses 430 and 434 join together with respective circumferential and axial recesses 420 and 424.

With continued reference to FIGS. 4-7, the depicted recesses do not extend through the full thickness of the shield (i.e., they do not penetrate the shield body). In some embodiments, the recesses may have a depth that is about 10 percent to about 50 percent of a thickness of the shield. At depths of less than about 10 percent of the thickness, shield wear over time can remove the recess resulting in calibration errors owing to a change in shield attenuation. At depths of greater than about 50 percent of the thickness, the mechanical integrity of the shield may be compromised. In some embodiments, depths ranging from about 20 percent to about 40 percent of the shield thickness provide for significant shield wear without adversely affecting the mechanical integrity of the shield.

Figure 8A:
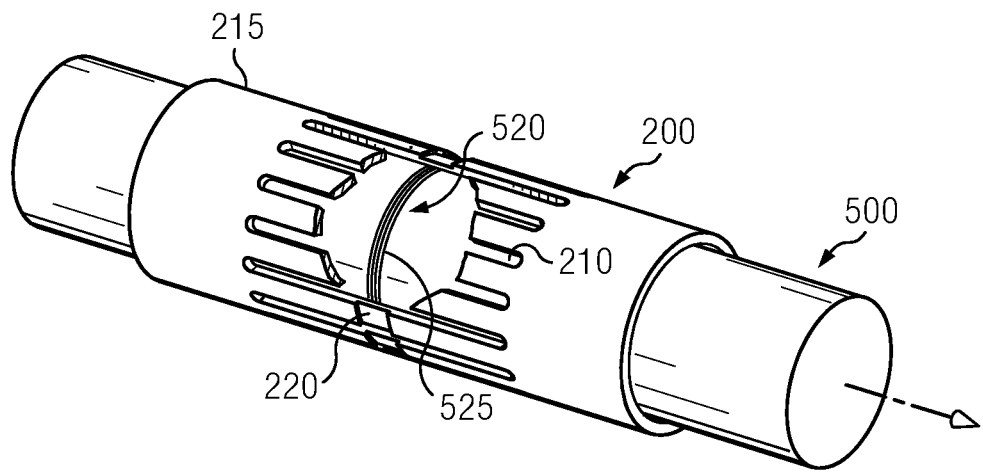
FIGS. 8A and 8B depict example electromagnetic logging tool embodiments employing the shields depicted on FIG. 4 (8A) and FIG. 5 (8B).
Figure 8B:
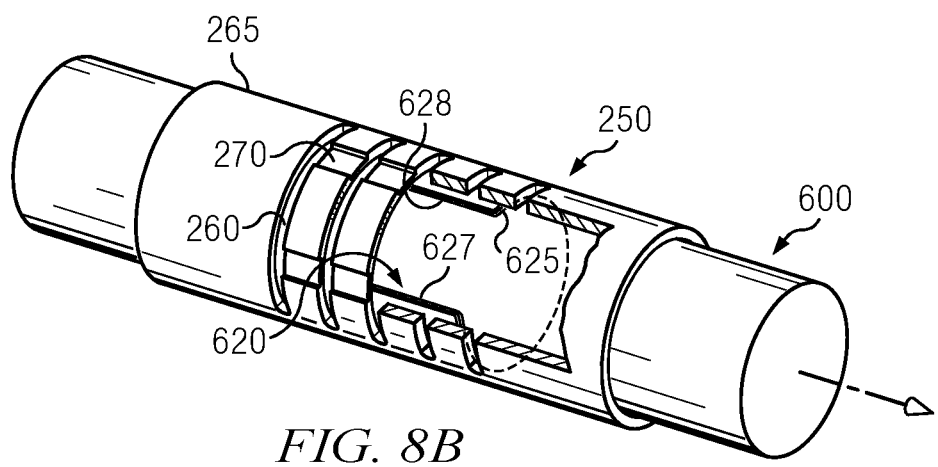

FIGS. 8A and 8B (collectively FIG. 8) depict example electromagnetic logging tool embodiments 500 and 600. FIG. 8A depicts a logging tool embodiment 500 including an axial antenna 520 having an antenna coil 525 circumferentially wound about the tool body (or mandrel). In the depicted embodiment, shield 200 (FIG. 4) is deployed about the axial antenna 520. As described above, shield 200 includes a plurality of circumferentially spaced axial slots 210 and at least one circumferential recess 220 in the outer surface 215 of the shield. As further depicted, the recess 220 is deployed radially above (outward from) the antenna coil 525. By radially above it is meant that the recess 220 is radially outward from the antenna coil 525 (where the radial direction is orthogonal to the tool axis). Stated another way the antenna coil 525 is located radially between the center of the tool and the recess 220.

FIG. 8B depicts a logging tool embodiment 600 including a transverse antenna 620 having a saddle coil 625 (an antenna coil 625 wound in a saddle configuration about the tool body). In the depicted embodiment, shield 250 (FIG. 5) is deployed about the transverse antenna 620. As described above, shield 250 includes a plurality of axially spaced circumferential slots 260 and may further include first and second, parallel axial recesses 270 that are substantially orthogonal to the slots 260. As further depicted, the recesses 270 are deployed radially outward from corresponding first and second axial portions 627 and 628 of the antenna coil 625.

While not depicted in FIGS. 4 through 8, it will be appreciated that the disclosed shields may be encapsulated in a substantially electrically non-conducting material such as PEEK (a polyaryletheretherketone) (either before or after deployment on a logging tool). By substantially electrically non-conducting it is meant that the electrical conductivity of the material is negligible as compared to the electrical conductivity of the shield. The non-conducting material may fill the slots and thereby provide fluid isolation from drilling fluid external to the tool (in the wellbore annulus).

Figure 9A:
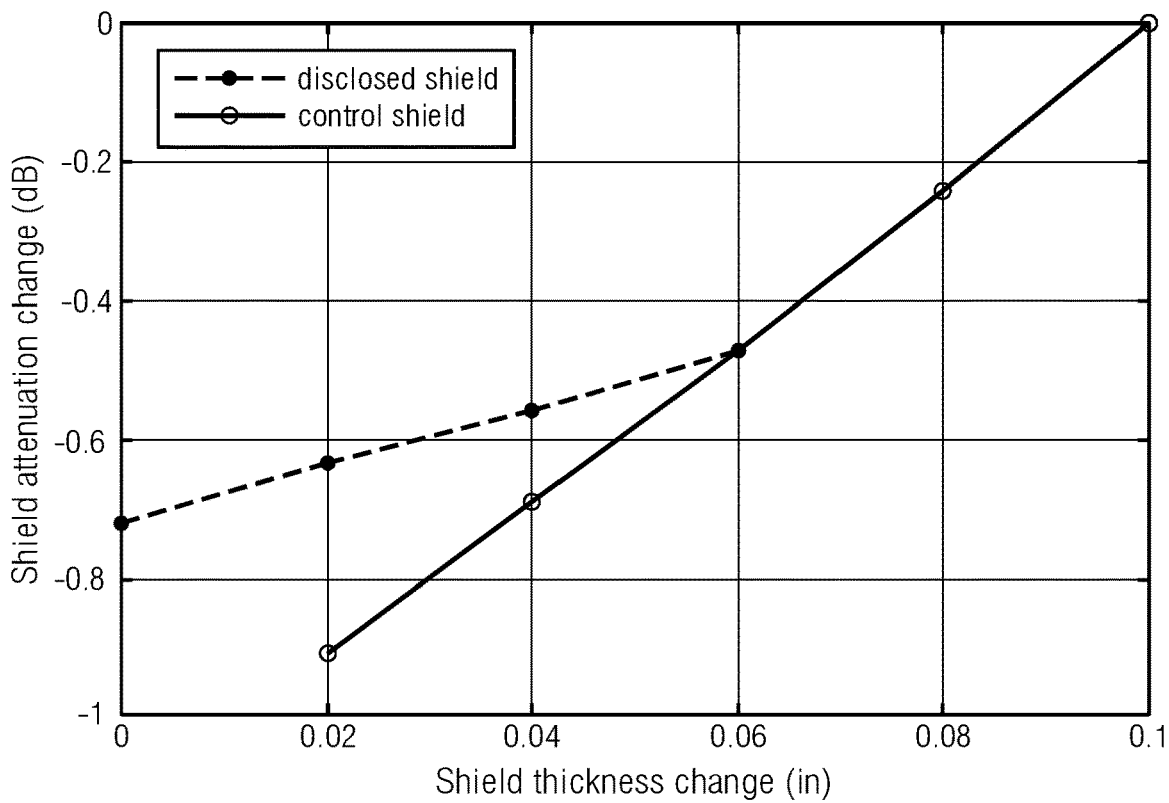
FIGS. 9A and 9B depict plots of modeled shield attenuation change in decibels (dB) versus change in shield thickness in units of inches for an axial (z-mode) antenna coil (8A) and a transverse (x-mode) antenna coil (8B).
Figure 9B:
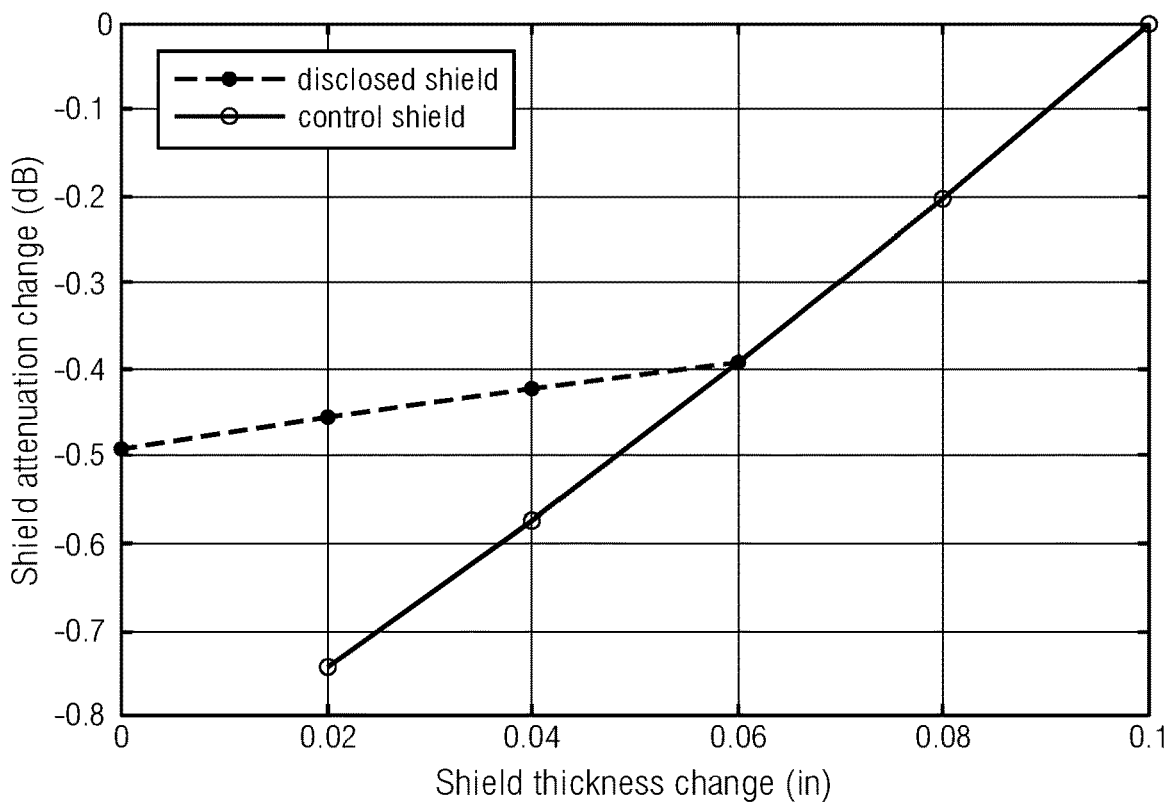

The example described below with respect to FIGS. 9A and 9B further illustrates the disclosed embodiments, but, should not be construed as in any way limiting its scope. FIGS. 9A and 9B depict plots of modeled shield attenuation change in decibels (dB) versus change in shield thickness in units of inches for an axial (z-mode) coil (9A) and a transverse (x-mode) coil (9B). The modeled shields had a thickness of 0.25 inch (6.35 mm). A modeled shield according to embodiments of the present disclosure had a recess depth of 0.06 inch (24 percent of the shield thickness). A modeled control shield did not include any recesses in the outer surface of the shield.

As depicted, the change in attenuation increases approximately linearly with increasing change in thickness (i.e., with an increase in reduction of the shield thickness, for example, owing to wear). An attenuation change per mil of thickness change (i.e., per one thousandth of an inch thickness change) may be obtained from the slope of the line. The modeled control shield exhibited changes in attenuation of 0.011 dB per mil for an axial antenna (9A) and 0.009 dB per mil for a transverse antenna (9B). The modeled inventive shield exhibited much lower changes in attenuation of 0.005 dB per mil for the axial antenna (9A) and 0.002 dB per mil for the transverse antenna (9B) (a reduction of 55 percent for the axial antenna and a reduction of 78 percent for the transverse antenna). The intercept at a shield thickness of 0.06 inches (1.524 mm) represents the point at which the change in shield thickness (e.g., owing to wear) has completely removed the recesses.

The disclosure includes numerous embodiments. These embodiments include, but are not limited to, the following embodiments.

In a first embodiment, an antenna shield is disclosed. The shield is configured for deployment about an antenna on an electromagnetic logging tool, in which the antenna is configured to transmit or receive electromagnetic energy in a subterranean wellbore. The shield includes an electrically conductive, hollow body configured for deployment about the antenna, the hollow body including a plurality of slots therethrough, an outer surface of the hollow body including at least one recess, at least a portion of which extends between and substantially orthogonal to the plurality of slots.

A second embodiment includes the first embodiment, wherein the slots extend in an axial direction along a length of the hollow body and the portion of the recess extends in a circumferential direction about the hollow body and between the slots.

A third embodiment includes the second embodiment, wherein the recess intercepts the plurality of slots at about a midpoint of an axial length of the slots.

A fourth embodiment includes the first embodiment, wherein the slots extend in a circumferential direction about the hollow body and the portion of the recess extends in an axial direction along the length of the hollow body between the slots.

A fifth embodiment includes the fourth embodiment, comprising first and second parallel recesses extending in the axial direction between the slots.

A sixth embodiment includes the first embodiment, wherein the slots are angled with respect to one another and the recess intercepts each of the plurality of slots at about a midpoint of a length of the slots.

A seventh embodiment includes the sixth embodiment, wherein the recess is tilted with respect to a longitudinal axis of the shield.

An eighth embodiment includes the first embodiment, wherein the hollow body includes a first plurality of axial slots extending in an axial direction along a length of the shield and a second plurality of circumferential slots extending in a circumferential direction about the shield; and the recess includes a circumferential recess extending in a circumferential direction about the hollow body between the axial slots and at least one axial recess extending in an axial direction between the circumferential slots.

A ninth embodiment includes the first embodiment, comprising first and second parallel axial recesses extending in an axial direction between the circumferential slots.

A tenth embodiment includes any one of the first through the ninth embodiments, wherein the outer surface of the hollow body further includes another recess about a periphery of at least one of the slots.

An eleventh embodiment includes any one of the first through the tenth embodiments, wherein the recess has a depth that is about 10 percent to about 50 percent of a thickness of the shield.

In a twelfth embodiment, a logging tool is disclosed. The logging tool includes a logging tool body configured for deployment in a wellbore; at least one electromagnetic antenna deployed on the tool body, the antenna configured to transmit or receive electromagnetic energy in a subterranean wellbore; and a substantially cylindrical, electrically conductive shield deployed coaxially on the tool body about the antenna, the shield including a plurality of slots therethrough, an outer surface of the of shield including at least one recess, at least a portion of which extends between and substantially orthogonal to the plurality of slots.

A thirteenth embodiment includes the twelfth embodiment, wherein the antenna is an axial antenna; the slots extend in an axial direction along a length of the shield; and the recess extends in a circumferential direction between the slots.

A fourteenth embodiment includes the thirteenth embodiment, wherein the recess intercepts the plurality of slots at about a midpoint of an axial length of the slots.

A fifteenth embodiment includes the fourteenth embodiment wherein the axial antenna includes a circumferentially wound coil and the recess is located radially above the coil.

A sixteenth embodiment includes the twelfth embodiment, wherein: the antenna is a transverse antenna; the slots extend in a circumferential direction about the shield; and the recess extends in an axial direction along a length of the shield between the slots.

A seventeenth embodiment includes the sixteenth embodiment, wherein the transverse antenna includes a saddle coil having first and second axial portions and the first and second axial portions of the saddle coil are orthogonal to the slots.

An eighteenth embodiment includes the seventeenth embodiment, wherein: the shield includes first and second recesses extending in an axial direction along a length of the shield and the first and second recesses are located radially above the corresponding first and second axial portions of the saddle coil.

A nineteenth embodiment includes the twelfth embodiment, wherein: the antenna is a tilted antenna; the slots are angled with respect to one another; and the recess is tilted with respect to a longitudinal axis of the shield.

A twentieth embodiment includes the nineteenth embodiment, wherein the recess intercepts each of the plurality of slots at about a midpoint of a length of the slots.

A twenty-first embodiment includes the twelfth embodiment, wherein: the antenna includes a first axial antenna and a second transverse antenna; the shield is deployed about both the axial antenna and the transverse antenna; the shield includes a first plurality of axial slots extending in an axial direction along a length of the shield and a second plurality of circumferential slots extending in a circumferential direction about the shield; and the recess includes a circumferential recess extending in a circumferential direction between the axial slots and at least one axial recess extending in an axial direction between the circumferential slots.

A twenty-second embodiment includes the twenty-first embodiment, wherein: the axial antenna includes a circumferentially wound coil that is located radially below the circumferential recess; the axial recess includes first and second parallel axial recesses; and the transverse antenna includes a saddle coil having first and second parallel axial portions that are located below the corresponding first and second axial recesses.

A twenty-third embodiment includes any one of the twelfth through the twenty-second embodiments, wherein the outer surface of the hollow body further includes another recess about a periphery of at least one of the slots.

A twenty-fourth embodiment includes any one of the twelfth through the twenty-third embodiments, wherein the recess has a depth that is about 10 percent to about 50 percent of a thickness of the shield.

A twenty-fifth embodiment includes any one of the twelfth through the twenty-fourth embodiments, wherein the logging tool body is a logging while drilling tool body configured for deployment in drill string.

Although an antenna shield for an electromagnetic logging tool has been described in detail, it should be understood that various changes, substitutions and alternations can be made herein without departing from the spirit and scope of the disclosure as defined by the appended claims. These described embodiments are examples of the presently disclosed techniques. In an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. Terms such as up, down, top and bottom, and other like terms should be understood to be relative positions to a given point and may be utilized to more clearly describe some features. Commonly, these terms relate to a reference point such as the surface from which drilling operations are initiated.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, or within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. Although only a few example embodiments have been described in detail above, those skilled in the art will readily appreciate that many modifications are possible in the example embodiments without materially departing from this invention. Accordingly, all such modifications are intended to be included within the scope of this disclosure.

The invention claimed is:

1. A shield configured for deployment about an antenna on an electromagnetic logging tool, the antenna being configured to transmit or receive electromagnetic energy in a subterranean wellbore, the shield comprising:
   a hollow body configured for deployment about the antenna, the hollow body including a plurality of slots extending through the hollow body, wherein the hollow body is electrically conductive; and
   at least one recess, wherein the at least one recess does not extend through the full thickness of the hollow body, wherein the at least one recess intersects a first slot of the plurality of slots and a second slot of the plurality of slots, and wherein the at least one recess extends substantially orthogonal to the plurality of slots.

2. The shield of claim 1, wherein:
   the first slot and the second slot extend in an axial direction along a body length of the hollow body; and
   the at least one recess extends in a circumferential direction about the hollow body and from the first slot to the second slot.

3. The shield of claim 2, wherein the at least one recess intercepts the first slot and the second slot at a midpoint of an axial length of the first slot and the second slot.

4. The shield of claim 1, wherein:
   the first slot and the second slot extend in a circumferential direction about the hollow body; and
   the at least one recess extends in an axial direction along a body length of the hollow body from the first slot to the second slot.

5. The shield of claim 4, wherein the at least one recess includes a first recess and a second recess, and wherein the first recess and the second recess are parallel and extend in the axial direction from the first slot to the second slot.

6. The shield of claim 1, wherein:
   the first slot and the second slot are angled with respect to one another; and
   the at least one recess intercepts each of the plurality of slots at about a midpoint of a slot length of the plurality of slots.

7. The shield of claim 6, wherein the at least one recess is tilted with respect to a longitudinal axis of the shield.

8. The shield of claim 1, wherein the plurality of slots includes a first plurality of axial slots extending in an axial direction along the shield and a second plurality of circumferential slots extending in a circumferential direction about the shield, and wherein the at least one recess includes a circumferential recess extending in the circumferential direction about the hollow body at the first plurality of axial slots and an axial recess extending in the axial direction at the second plurality of circumferential slots.

9. The shield of claim 8, wherein the axial recess includes first axial recess and a second axial recess, the first axial recess and the second axial recess extending in a parallel manner in the axial direction at the second plurality of circumferential slots.

10. The shield of claim 1, wherein the at least one recess includes a first recess, and further comprising a second recess extending around a periphery of at least one of the first slot or the second slot.

11. The shield of claim 1, wherein the at least one recess has a depth that is about 10 percent to about 50 percent of the thickness of the shield.

12. An electromagnetic logging tool comprising:
   a logging tool body configured for deployment in a wellbore;
   an electromagnetic antenna deployed on the logging tool body, the electromagnetic antenna configured to transmit or receive electromagnetic energy in a subterranean wellbore; and
   a shield, wherein the shield is substantially cylindrical and electrically conductive, and wherein the shield is deployed coaxially on the logging tool body about the electromagnetic antenna, the shield including:
      a plurality of slots extending through the shield, wherein the plurality of slots includes a first slot and a second slot; and
      a recess extending partially into an outer surface of the shield;
      wherein the recess does not extend through a full thickness of the shield, wherein the recess extends from the first slot to the second slot to intersect the first slot and the second slot and is substantially orthogonal to the first slot and the second slot.

13. The electromagnetic logging tool of claim 12, wherein:
   the electromagnetic antenna is an axial antenna;
   the plurality of slots extends in an axial direction along the shield; and
   the recess extends in a circumferential direction between the first slot and the second slot.

14. The electromagnetic logging tool of claim 13, wherein the recess intercepts the first slot and the second slot at about a midpoint of a slot length of the first slot and the second slot.

15. The electromagnetic logging tool of claim 13, wherein:
   the axial antenna includes a circumferentially wound coil; and
   the recess is located radially above the circumferentially wound coil.

16. The electromagnetic logging tool of claim 12, wherein:
   the electromagnetic antenna is a transverse antenna;
   the plurality of slots extends in a circumferential direction about the shield; and
   the recess extends in an axial direction along the shield between the first slot and the second slot.

17. The electromagnetic logging tool of claim 16, wherein:
   the transverse antenna includes a saddle coil having a first axial portion and a second axial portion; and
   the first axial portion and the second axial portion of the saddle coil are orthogonal to the plurality of slots.

18. The electromagnetic logging tool of claim 17, wherein:
   the recess includes a first recess and a second recess extending in the axial direction along the shield; and
   the first recess is located radially above the first axial portion of the saddle coil and the second recess is located radially above the second axial portion of the saddle coil.

19. The electromagnetic logging tool of claim 12, wherein:
  the electromagnetic antenna is a tilted antenna;
  the plurality of slots is angled with respect to one another; and
  the recess is tilted with respect to a longitudinal axis of the shield.

20. The electromagnetic logging tool of claim 19, wherein the recess intercepts the first slot and the second slot at about a midpoint of a slot length of the first slot and the second slot.

21. The electromagnetic logging tool of claim 12, wherein:
  the electromagnetic antenna includes a first axial antenna and a second transverse antenna;
  the shield is deployed about both the first axial antenna and the second transverse antenna;
  the shield includes a first plurality of axial slots extending in an axial direction along the shield and a second plurality of circumferential slots extending in a circumferential direction about the shield; and
  the recess is a circumferential recess extending in the circumferential direction between at least two axial slots of the first plurality of axial slots and the shield further includes an axial recess extending in the axial direction between at least two circumferential slots of the second plurality of circumferential slots.

22. The electromagnetic logging tool of claim 21, wherein:
  the first axial antenna includes a circumferentially wound coil that is located radially below the circumferential recess;
  the axial recess includes a first axial recess and a second axial recess, wherein the first axial recess and the second axial recess are parallel; and
  the second transverse antenna includes a saddle coil having a first axial portion and a second axial portion, wherein the first axial portion and the second axial portion are parallel and wherein the first axial portion is located below the first axial recess and the second axial portion is located below the second axial recess.

23. The electromagnetic logging tool of claim 12, wherein the recess is a first recess, and wherein the shield further includes a second recess extending around a periphery of at least one slot of the plurality of slots.

24. The electromagnetic logging tool of claim 12, wherein the recess has a depth that is about 10 percent to about 50 percent of the thickness of the shield.

25. The electromagnetic logging tool of claim 12, wherein the logging tool body is a logging while drilling tool body configured for deployment in drill string.

* * * * *